(No Model.)
K. W. EUBANK.
COMBINED TRUNK AND BUREAU.
No. 369,000. Patented Aug. 30, 1887.
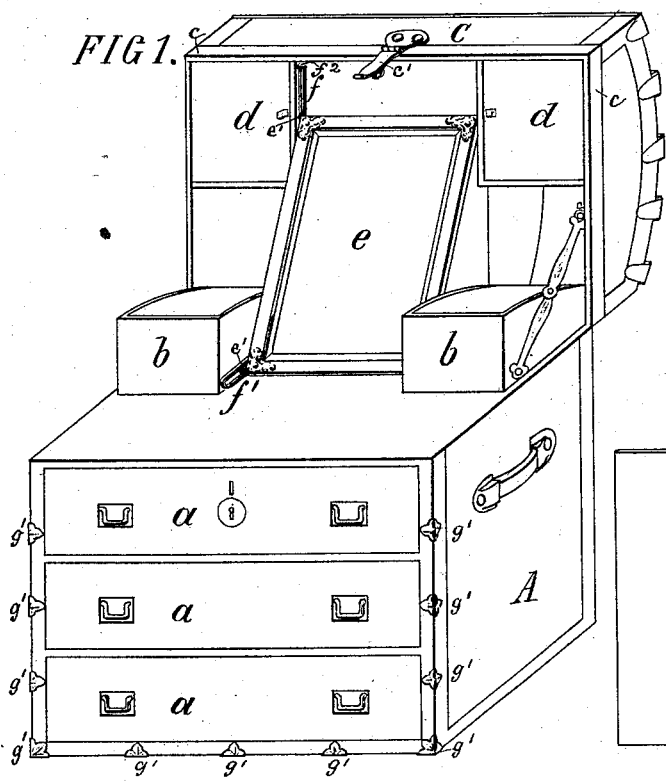
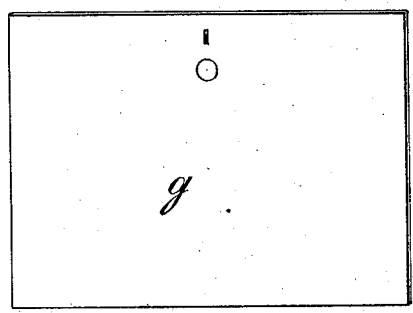
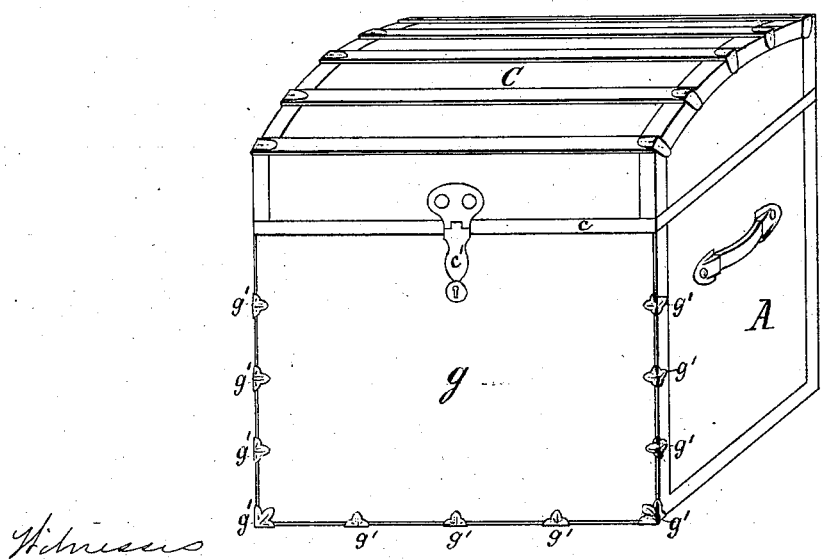

UNITED STATES PATENT OFFICE.

KATIE W. EUBANK, OF RUTHERFORD, CALIFORNIA.

COMBINED TRUNK AND BUREAU.

SPECIFICATION forming part of Letters Patent No. 369,000, dated August 30, 1887.

Application filed May 28, 1887. Serial No. 239,715. (No model.)

*To all whom it may concern:*

Be it known that I, KATIE W. EUBANK, residing at Rutherford, in the county of Napa and State of California, have invented a new and useful Improvement in Traveling Trunk and Bureau Combined, of which the following is a specification.

My invention consists in certain novel constructions, combinations, and arrangements of parts in a combined trunk and bureau, as will be hereinafter described and specifically claimed.

Figure 1 is a perspective view of the entire trunk opened and set up as a bureau. Fig. 2 represents a plate as taken off from the front of the trunk, and Fig. 3 is a perspective view of the trunk when closed.

The trunk contains several drawers, $e\ e\ e$, as shown in Fig. 1. The handles or knobs are sunk into the front boards of said drawers. The upper one of the drawers $a$ is provided with a suitable spring-lock for fastening the hasp $C'$, and this lock is operated by a key inserted into a key-hole of the drawer and a corresponding hole in the safety lock-plate $g$, hereinafter described.

On the top of the trunk A there are two dressing-cases, $b\ b$, with drawers, Fig. 1, the height of these dressing-cases being equal to the depth of the cover C of the trunk. Inside the cover C there are two other dressing-cases, $d\ d$, as shown in Fig. 1, which, when the trunk is closed, occupy the space in front of the cases $b\ b$. The mirror or looking-glass $e$ is so arranged that it can be inclined and will remain steady at any angle. The upper edge glides up and down between the cases $d\ d$, the lower backward and forward between the cases $b\ b$. For this purpose there are small lugs $e'$ fastened to the frame of the mirror $e$—one on each corner—which glide in stationary vertical guides $f f$ and horizontal guides $f'\ f'$.

By setting the mirror first in an upright or vertical position (the trunk being open) and turning it down so that its face comes to be flat on the top of the bureau portion of the trunk, I get access to the space behind the mirror inside the cover or lid of the same, which space may be used for any required purpose.

Openings $f^2$ may be provided in the vertical guides $f$ for the passage outward of the lugs $e'$ when the mirror is to be adjusted in a horizontal position, as just described.

To the front of the trunk there is secured a thin plate of galvanized sheet-iron, $g$, (see Figs. 2 and 3,) which plate protects the drawers $a\ a\ a$ and prevents them from being opened. In the accompanying Figs. 1 and 3, this plate is shown as held in place by a number of iron cleats, $g'$, which are fastened to the front edges of the trunk. To put this plate on or off, it is simply necessary to slide it vertically in or out. The metal rim $c$ of the cover or lid C of the trunk holds down the plate $g$ by its upper edge, and prevents it from being lifted out as long as the trunk is closed or the hasp $c'$ held by the lock.

Having thus fully described my invention, what I claim as new, and desire to secure by Letters Patent, is—

1. The combined trunk and bureau comprising the outer body portion or case, A, hinged cover C, drawers $a$, the upper one of which is provided with a suitable lock for holding the hasp $C'$ of the cover C, cleats $g'$ on body A, rim $c$ on cover C, plate $g$, the dressing-cases $d\ d\ b\ b$, provided, respectively, with the vertical guides $f$ and the horizontal guides $f'$, and the mirror $e$, having lugs $e'$, substantially as and for the purpose described.

2. The combination of the mirror $e$ with the combined trunk and bureau, said mirror being fitted by its lugs $e'$ in vertical guides $f$, having openings $f^2$, of the dressing-cases $d\ d$ in the cover C, and fitted by similar lugs in horizontal guides $f'$ of the dressing-cases $b\ b$, the said cases $d$ and $b$ being arranged to pass one another when the cover C is being opened or closed, substantially as and for the purpose described.

KATIE W. EUBANK.

Witnesses:
B. F. KETTLEWELL,
J. A. KETTLEWELL.